MOTOR ACCELERATION RATE CONTROL AMPLIFIER

Filed Nov. 21, 1967

INVENTOR.
ALLAN W. HOUGH
BY Stephen P. Fox
AGENT

United States Patent Office 3,536,975

Patented Oct. 27, 1970

3,536,975

MOTOR ACCELERATION RATE CONTROL AMPLIFIER

Allan W. Hough, Detroit, Mich., assignor to Burroughs Corporation, Detroit, Mich., a corporation of Michigan Filed Nov. 21, 1967, Ser. No. 684,825
Int. Cl. H02p 1/04
U.S. Cl. 318—396 12 Claims

ABSTRACT OF THE DISCLOSURE

A motor starting circuit including a power transistor 21 for controlling the current supplied from a power source to a motor. The power transistor is initially operable in a partially conducting amplifying mode under the control of an adjustable bias current limiting resistor 29. When the motor attains a predetermined speed after a time interval dependent on the setting of the adjustable resistor, a Zener diode 43 turns on a transistor 37, which gates additional bias current to the power transistor to drive it into a fully conducting saturated mode.

BACKGROUND OF THE INVENTION

The present invention relates generally to a motor acceleration time delay system, and more particularly to a motor starting current control device responsive to a predetermined voltage input condition of the motor.

Motor acceleration control devices serve diverse purposes in a wide variety of applications. For example, in a magnetic tape transport mechanism, such control devices may be used to regulate the power supplied to motors which drive the tape reels during a tape rewinding operation. At the initiation of a tape rewind operation, the two tape reels generally do not have the same effective diameters, due to the different amounts of tape on each reel, so that there is a variable load differential between the tape reels. Under these conditions, torque surges and subsequent irregular acceleration of the reel driving motors may occur, with consequent tape stretching or spill-off of the tape from the reels. In order to prevent possible damage to the tape, the motor current must be limited to a relatively low starting value for a predetermined length of time to effect a gradual build-up of the motor speed. Thereafter, a larger current may be applied to the motor to maintain it at its rated running speed.

The time delay of motor acceleration has been achieved in a variety of well-known ways. One type of system uses a temperature sensitive resistance element, such as a thermistor, in the power line to a motor to control the current supplied thereto. The thermistor has a negative temperature coefficient so that a high resistance limits the starting current and prevents surges when the motor is initially energized. As the thermistor heats up, the resistance thereof gradually decreases to permit a larger current flow to the motor. This system has the disadvantage that long acceleration time delays for high current motors may be achieved only with thermistors which are expensive and physically large in order to dissipate the great amount of heat produced. Also this system may prove unsatisfactory in that the current limiting characteristics and the resulting time delay are functions of the temperature, not the motor speed. Thus, if a thermistor having a predetermined temperature coefficient is selected for a given time delay, the motor current may increase too rapidly when the motor is heavily loaded, or too slowly when the motor is lightly loaded.

Another type of motor starting system utilizes a resistance-capacitance (RC) network connected between a power source and a motor, whereby the motor current is gradually increased as a function of the RC time constant of the network. Therefore, in this system, the time delay during motor acceleration is dependent on the applied motor current and the values of the resistance and capacitance. In applications where the motor draws a large current and the required time delay is long, the value of the capacitor necessary for the circuit would be so large and expensive as to prohibit commercial feasibility. Also, since the time delay of the system is independent of the actual motor speed, it may be unsatisfactory for use in cases where the motor load is constantly changing, as in the aforementioned tape rewinding application.

Still another type of motor starting system is one in which a plurality of resistors is connected in series with the armature of a motor. During motor acceleration, the resistors are progressively shunted by the switch contacts of relays which have their energizing coils connected across the armature winding. The relay energizing coils are responsive to predetermined values of the counter-electromotive force developed by the motor, so that the acceleration time delay is directly dependent upon motor speed. Thus the time delay is variable depending upon the motor load. However, this system has the disadvantage that it utilizes large and costly components having moving parts and electrical contacts which easily erode and require frequent maintenance. Also, the relay energizing coils must be manufactured in accordance with carefully controlled design criteria in order to be responsive to predetermined values of the counter-electromotive force. Since the coils cannot readily be changed, the system may prove unsatisfactory in applications where an adjustable acceleration time delay is required.

OBJECTIVES AND SUMMARY OF THE INVENTION

In view of the deficiencies of prior art motor controllers pointed out above, it is an object of this invention to provide an improved device for controlling the acceleration rate of a high current motor during a long time interval.

It is another object of this invention to provide an improved motor acceleration control device in which the time period of control is dependent upon the motor speed and thus will be variable as a function of the applied motor load.

It is a further object of the present invention to provide an improved motor starting device for controlling the acceleration rate of a motor during a predetermined time period which is easily adjustable.

It is a still further object of this invention to provide an improved motor starting device having a simplified, compact, and economical configuration utilizable, for example, in a tape transport mechanism to control the motors which drive the tape reels during a rewinding operation.

In accordance with the foregoing objectives and other desirable purposes, applicant's inventive motor power control device, in its broadest aspects, comprises a power regulating element, such as a power transistor, connected in a series current path between a power source and a motor; variable resistance means for adjustably biasing the power regulating element in a partially conducting amplifying mode; and feedback means responsive to a predetermined motor voltage for operating the power regulating element in a fully conducting mode. The feedback means includes electroresponsive switch means for shunting the variable resistance means, and voltage threshold sensitive means, such as a Zener diode, coupled to the motor input for controlling the electroresponsive shunting switch means.

DESCRIPTION OF THE PREFERRED EMBODIMENT

Figure 1:
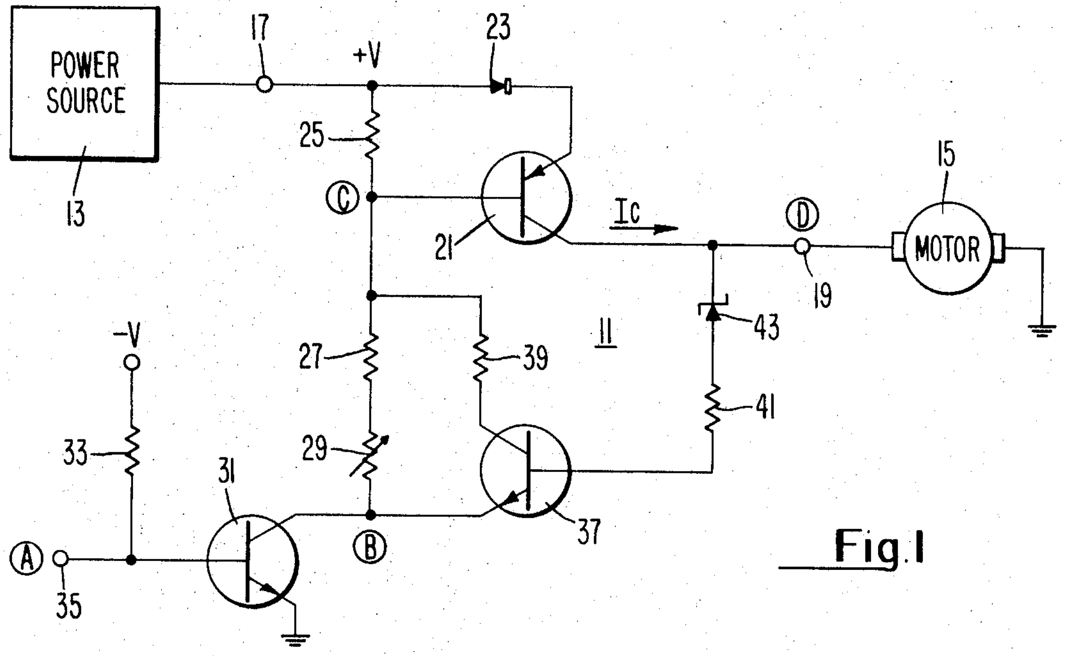
FIG. 1 is a schematic diagram illustrating the preferred embodiment of the motor acceleration rate control device of the present invention.

Referring now to FIG. 1, applicant's control circuit, designated generally by the reference character 11, is connected between a power source 13 and a motor 15. The power source 13 supplies current through an input terminal 17 at a predetermined positive potential +V, as measured with respect to ground or a reference potential. The motor 15 has two terminals, one of which is grounded and the other of which is supplied with power through an output terminal 19 of the control circuit.

The internal configuration of the motor 15 is not critical to the operation of applicant's invention, the only requirement being the well-known motor characteristic that the input terminals of the motor reflect the increase in effective motor impedance during acceleration, due to the gradual increase of the counter-electromotive force. Thus any one of a wide variety of commonly available motors may be utilized. Although only one motor is illustrated in FIG. 1, it has been found that a plurality of motors may be connected to the output terminal 19. For example, two motors may be used to drive the supply and takeup reels, respectively, of a magnetic tape transport mechanism.

The control circuit 11 includes a power regulating element, illustrated as a power transistor 21 of the PNP type having its emitter and collector electrodes connected in a series current path between the input terminal 17 and the output terminal 19. Also connected in this series current path between terminal 17 and the emitter of transistor 21 is a biasing diode 23 having its cathode and anode electrodes poled to permit current flow through the power transistor 21. The base electrode of power transistor 21 is connected to a biasing network for controlling current conduction between the emitter and collector electrodes. Specifically, the biasing network includes two fixed value resistors 25 and 27, and a variable resistor 29, which are connected in series between the input terminal 17 and ground through the emitter-collector current path of a transistor switch 31, described hereinafter. The base electrode of transistor 21 is connected to the junction point of resistors 25 and 27.

Transistor 31 is of the NPN type and has its emitter electrode connected to ground and its collector electrode connected to the variable resistor 29. The base electrode of transistor 31 is coupled through a resistor 33 to a source of biasing potential −V, which is negative with respect to ground. The base of transistor 31 is also connected to a terminal 35 for receiving enabling signals, as hereinafter described.

The biasing network for power transistor 21 also includes electroresponsive feedback means for bypassing or shunting the series connected resistors 27 and 29. In the illustrated embodiment, the bypassing or shunting means is a current gating transistor 37 of the NPN type and a resistor 39, the series combination of which is connected in parallel with the resistors 27 and 29. Specifically, the emitter electrode of transistor 37 is connected to the junction of resistor 29 and the collector electrode of transistor 31. The collector electrode of transistor 37 is coupled to one end of resistor 39, the other end of resistor 39 being connected to the junction of resistors 25 and 27. The base electrode of transistor 37 is controlled by the motor voltage signal which is fed back from terminal 19 through the series connection of a resistor 41 and a Zener diode 43. The Zener diode 43 is poled against the direction of normal current flow, with its cathode connected to terminal 19 and its anode connected to one end of resistor 41. The other end of resistor 41 is connected to the base electrode of transistor 37. When the voltage at terminal 19 reaches a predetermined value, the Zener diode 43 will break down and conduct to switch the transistor 37 into saturation.

The operation of applicant's motor acceleration rate control circuit may best be understood with reference to FIGS. 2*a–d*, which illustrate the voltage waveforms present at each of the points A, B, C and D shown in FIG. 1.

Assuming that initially no signal is applied to the enabling input terminal 35 point A, the base-emitter junction of transistor 31 will be reverse biased by the negative potential −V received through resistor 33. Thus the emitter-collector current path of transistor 31 will be non-conducting and the voltage at points B, the collector of transistor 31 and C the base of transistor 21 will be substantially +V. Therefore the emitter-base junction of power transistor 21 will be reverse biased due to the voltage drop across diode 23, so that this transistor will be non-conducting and no current will be supplied from the power source 13 to the motor 15.

Figure 2:
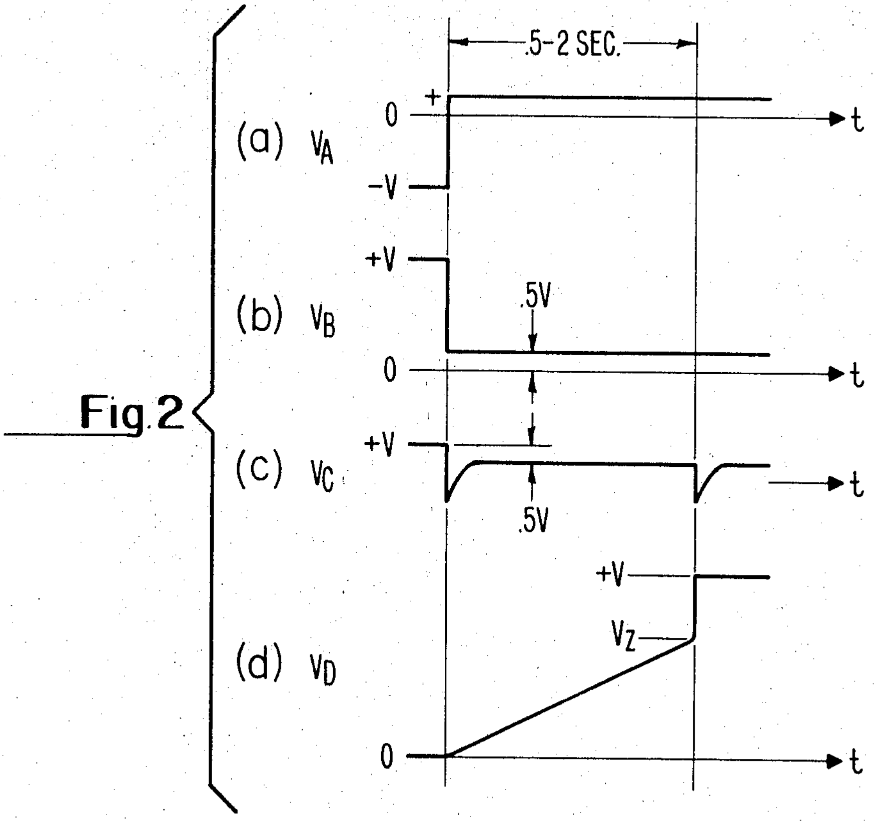
FIGS. 2*a–d* are graphs illustrating the voltage characteristics at corresponding points A–D in the circuit of FIG. 1.

When an enabling signal having a slightly positive voltage level is applied to the input terminal 35, as shown in FIG. 2*a*, transistor 31 is forward biased into saturation and will conduct to establish a current path through the series connected resistors 25, 27 and 29. The voltage at point B is equal to the drop across the transistor 31 and will be approximately .5 volt, as shown in FIG. 2*b*. Initially, the voltage dividing action of resistors 25, 27 and 29 will attempt to establish a drop of several volts across the resistor 25; however, as soon as the emitter-base junction of power transistor 21 becomes forward biased, the voltage drop across the junction will be a maximum of a few tenths of a volt. Therefore the combined voltage drop across diode 23 and the emitter-base junction of transistor 21 will maintain point C at approximately .5 volt below the potential +V. The resulting initial voltage dip is shown in exaggerated form in FIG. 2*c*. This figure also illustrates a similar voltage dip which occurs after a predetermined time when transistor 21 is biased into saturation, as hereinafter described.

The biasing current through the emitter-base junction of power transistor 21 is dependent upon the values of resistor 27 and variable resistor 29. As well known in the transistor art, the current conducted between the emitter and collector electrodes of transistor 21 is a multiple of this biasing current, as determined by the forward current gain of the transistor. Therefore, by adjusting the variable resistor 29 to limit the biasing current to a predetermined value, the degree of current conduction through transistor 21 can easily be regulated. The transistor 21 will operate in a non-saturated, partially conducting, amplifying mode to supply a predetermined current $I_c$ to the motor 15, and thus control its starting time, since the rate of acceleration of the motor is dependent upon its initial power input.

FIG. 2*d* illustrates the voltage at point D, i.e. the output terminal 19, during motor acceleration. It can be seen that initially the voltage across the motor is low due to the low effective motor impedance. At this time most of the potential +V of the power source 13 appears across the power transistor 21. As the motor accelerates, the counter-electromotive force produced thereby gradually increases, so that the voltage drop across the motor increases while the voltage drop across the transistor 21 decreases.

After a predetermined time interval dependent on the adjustment of variable resistor 29, the motor voltage will increase to the breakdown voltage $V_z$ of the Zener diode 43. This diode then conducts and forward biases switching transistor 37 through resistor 41. Transistor 37 saturates and conducts current through resistor 39 to the base electrode of power transistor 21. Thus the current path through the relatively high resistance combination of resistors 27 and 29 is effectively shunted or bypassed by the relatively low resistance current path through transistor 37 and resistor 39. Consequently the emitter-base biasing current for power transistor 21 will be greatly increased, so as to drive this transistor into a fully conducting saturated mode of operation. The motor 15 will then be supplied with a stepped up current at the full potential +V from the power source 13, minus a negligible voltage drop across diode 23 and the emitter-collector path of transistor 21. This increased power to the motor will cause it to quickly complete its acceleration up to its rated running speed.

In summarizing the operation of applicant's control circuit, the variable resistor 29 may be preset to any desired value to limit the emitter-base biasing current for transistor 21, which in turn limits the motor starting current to a low value. The acceleration rate of the motor is dependent upon the value of the starting current. After the motor reaches a predetermined speed at which the generated counter-electromotive force has a value equal to the breakdown threshold voltage of the Zener diode 43, transistor 21 is switched from a partially conducting non-saturated mode of operation to a fully conducting saturated mode of operation. Thereafter, the motor quickly attains its full running speed.

It has been found that satisfactory circuit operation may be achieved when the following components are used:

Power transistor 21—2N2081
Diode 23—1N1341
Resistor 25—620 ohms
Resistor 27—130 ohms (2 watts)
Variable resistor 29—100 ohm potentiometer
Transistor 31—2N3054
Resistor 33—20,000 ohms
Transistor 37—2N3403
Resistor 39—82 ohms (2 watts)
Resistor 41—390 ohms
Zener diode 43—1N714 (10 volts)

For the above-listed component values, the positive potential +V of the power source 13 and the negative biasing potential —V should be +15 volts and —15 volts, respectively. The circuit has been successfully used to control acceleration during an adjustable time interval ranging from one-half second to two seconds for a split-field series wound motor which draws current in the range of six amperes. Either larger or smaller motors of different types may be used, or longer acceleration time intervals may be achieved, provided that the maximum power dissipation characteristics of the power transistor 21 are not exceeded. To safeguard the power transistors from damage due to thermal runaway, the operation thereof should be switched from the amplifying mode to the saturated mode before regenerative heating of its semiconductor junctions occurs.

While applicant's motor acceleration rate control circuit has been shown and described in considerable detail, it will be understood that many changes or variations may be made therein without departing from the scope and spirit of the invention, as defined in the following claims.

I claim:

1. A motor acceleration control device comprising:
a power-regulating element having two main current carrying electrodes and a control electrode, said two main current carrying electrodes being connectable in a series current path between a source of power and the input to a motor, said element having a partially conducting state and a fully conducting state,
variable, passive impedance means directly connected to said control electrode for maintaining said power regulating element in said partially conducting state and adjustably limiting the current flow between said two main current carrying electrodes during the acceleration of said motor and while the voltage at said motor input is below a predetermined level,
electroresponsive means connected to said control electrode for bypassing said variable, passive impedance means and for switching said power regulating element to said fully conudcting state, and
threshold sensitive means for activating said electroresponsive means in response to said predetermined level of voltage at said motor input.

2. A current-regulating circuit for controlling the acceleration period of a motor comprising,
a power-regulating element having a control electrode and first and second current-carrying electrodes, said first current-carrying electrode being connectable to a source of power and said second current-carrying electrode being connectable to said motor for completing a series current path therebetween,
biasing means, connected to said control electrode, for operating said power regulating element in a partially conducting, amplifying state and at a predetermined level of current conduction during a period of controlled acceleration, said biasing means including a variable, passive resistance element, and
feedback means responsive to the attainment of a predetermined voltage at the motor input for shunting said variable passive resistance element and for driving said power-regulating element into a fully conducting, saturated state and ending said period of controlled acceleration.

3. The device of claim 1 wherein said variable, passive impedance means includes a variable resistor.

4. The device of claim 1 wherein said electroresponsive means includes a switching element having a conducting and a nonconducting state, said switching element being operable in said nonconducting state while the voltage at the motor input is below said predetermined level, said switching element having a control electrode connectable to said threshold sensitive means and also having two current-carrying electrodes connectable to shunt said variable passive impedance means.

5. The device of claim 4 wherein said threshold sensitive means includes a Zener diode having its cathode coupled to said motor input and its anode coupled to the control electrode of said switching element.

6. The circuit of claim 2 wherein said biasing means includes enabling means coupling to said variable, passive resistance element for initially activating said power-regulating element to said predetermined, partially conducting, amplifying state.

7. The circuit of claim 6 wherein said enabling means includes a source of potential and an initially non-conductive switching element, said initially non-conductive switching element having an input control electrode for receiving an enabling signal, said input control electrode being coupled to a source of bias potential, and said switching element also having two current-carrying electrodes coupled for completing a series current path between said variable, passive resistance element and ground.

8. The circuit of claim 2 wherein said feedback means couple the motor input to the control electrode of said power-regulating element and includes a switching element having a control elecrtode and two current-carrying electrodes, said two current-carrying electrodes being connected to shunt said variable, passive resistance element, and said switching element being operable in a nonconductive state while the voltage at said motor input is below said predetermined level.

9. The circuit of claim 8 wherein said feedback means also includes threshold sensing means for sensing said predetermined voltage level, indicative of a predetermined motor speed at the motor input, for initiating current feedback in response to said predetermined voltage level, and for triggering said switching element to a conductive state.

10. The circuit of claim 9 wherein said threshold sensing means includes a Zener diode having its cathode coupled to the input of said motor and its anode coupled to the control electrode of said switching element.

11. A current-regulating circuit for controlling the acceleration of a motor during a period from motor start to the attainment of a predetermined motor speed comprising:

a power-regulating transistor having a base, a collector, and an emitter, said emitter being connectable to a source of power and said collector being connectable to the input of said motor for completing a series current path therebetween, adjustably presettable biasing means connected to said base for maintaining said power-regulating transistor in a partially conductive amplifying state and at a predetermined level of current conduction during said period of controlled acceleration, said biasing means including a variable current-limiting resistor, feedback means responsive to the attainment of a predetermined level of voltage, indicative of said predetermined motor speed, at said motor input for supplying current from said motor input to the base of said power-regulating transistor and switching said power regulating transistor to a fully conductive, saturated state, said feedback means including, a first switching transistor having a collector connected to the base of said power-regulating transistor for providing a shunt path around said variable, current-limiting resistor, said first switching transistor being in a nonconductive state while the voltage at said motor input is below said predetermined level, and breakdown diode means responsive to the attainment of said predetermined level of voltage at said motor input for providing a current to the base of said first switching transistor and changing the conductive state thereof.

12. The invention of claim 11 wherein said circuit includes enabling means cooperable with said biasing means for initially activating said power-regulating transistor to said partially conductive, amplifying state and starting said motor, said enabling means including a source of bias potential and a second switching transistor, said second switching transistor being connectable between said variable resistor and ground and said second switching transistor having a base coupled to said source of bias potential, said base also providing an input means for receiving an enabling signal and for activating said second switching transistor to a conductive state in response thereto.

References Cited

UNITED STATES PATENTS

| | | | |
|---|---|---|---|
| 3,171,074 | 2/1965 | Momberg et al. | 318—331 XR |
| 3,242,410 | 3/1966 | Cockreel | 313—345 XR |
| 3,250,979 | 5/1966 | Shaw | 318—331 XR |
| 3,396,323 | 8/1968 | Auld | 318—331 |
| 3,414,791 | 12/1968 | Munson et al. | 318—331 |
| 3,422,331 | 1/1969 | Kearns | 318—331 |

GLEN R. SIMMONS, Primary Examiner

U.S. Cl. X.R.

318—415, 416, 504, 507